(12) United States Patent
White et al.

(10) Patent No.: US 8,723,397 B2
(45) Date of Patent: May 13, 2014

(54) DYNAMICALLY ADJUSTING PIEZOELECTRIC CURRENT SENSORS

(75) Inventors: Richard M. White, Berkeley, CA (US); Igor Paprotny, Berkeley, CA (US); Qiliang Xu, Berkeley, CA (US)

(73) Assignee: University of California, Berkeley, CA (US)

( * ) Notice: Subject to any disclaimer, the term of this patent is extended or adjusted under 35 U.S.C. 154(b) by 250 days.

(21) Appl. No.: 13/179,332

(22) Filed: Jul. 8, 2011

(65) Prior Publication Data

US 2012/0007468 A1 Jan. 12, 2012

Related U.S. Application Data

(60) Provisional application No. 61/362,646, filed on Jul. 8, 2010.

(51) Int. Cl.
*H01L 41/107* (2006.01)
(52) U.S. Cl.
USPC .................. 310/318; 310/319; 310/339
(58) Field of Classification Search
USPC .................. 310/317–319, 338, 339
See application file for complete search history.

(56) References Cited

U.S. PATENT DOCUMENTS

| | | | |
|---|---|---|---|
| 4,197,478 A | 4/1980 | Silvus, Jr. | |
| 6,882,086 B2 | 4/2005 | Kornbluh et al. | |
| 7,325,455 B2 * | 2/2008 | Campbell et al. | 73/514.34 |
| 7,745,974 B2 | 6/2010 | Goat et al. | |
| 8,222,754 B1 * | 7/2012 | Soliman et al. | 290/1 R |
| 2007/0089515 A1 * | 4/2007 | Shih et al. | 73/579 |
| 2008/0252174 A1 * | 10/2008 | Mohammadi et al. | 310/319 |
| 2009/0261689 A1 * | 10/2009 | Fang | 310/319 |
| 2011/0057458 A1 * | 3/2011 | Lee et al. | 290/1 R |

FOREIGN PATENT DOCUMENTS

| | | | | |
|---|---|---|---|---|
| GB | 1585549 | | 3/1981 | |
| JP | 59-186380 A | * | 4/1983 | H01L 41/09 |

* cited by examiner

*Primary Examiner* — Thomas Dougherty
(74) *Attorney, Agent, or Firm* — David R. Stevens; Stevens Law Group

(57) ABSTRACT

Provided are various embodiments of an adjustment circuit, having a base layer and a piezoelectric layer juxtaposed relative to the base layer and including a first electrode such that when the piezoelectric layer is stressed a polarization charge appears between the base layer and one side of the piezoelectric layer and an opposite polarization charge appears on an opposite side of the piezoelectric layer.

3 Claims, 9 Drawing Sheets

SCHEMATIC SYMBOL OF THE POTENTIOMETER

BLOCK DIAGRAM OF THE DIGITALLY-
CONTROLLED POTENTIOMETER

DYNAMICALLY ADJUSTING PIEZOELECTRIC CURRENT SENSORS

RELATED APPLICATIONS

This application is a non-provisional patent application, and a conversion of U.S. Provisional Patent Application Ser. No. 61/362,646 filed on Jul. 8, 2010.

BACKGROUND

The invention is directed to changing the functioning of piezoelectric current sensors and energy scavenging devices for use on power systems so as to prolong their useful life and compensate for small power system frequency variations as well as ambient temperature variations that might affect the resonant frequency of the resonant piezoelectric element.

Piezoelectric current sensors are widely used to monitor current flow and energy use in power systems. Often, they are configured with an energy scavenger device that uses energy from the current sources being monitored to make them self sufficient for energy in remote locations. Thus, power cables for example may be monitored in remote locations with low service requirements. One problem that occurs is fatigue of the energy scavengers as a result of prolonged use in service in applications where small power frequency changes result from variations in power demand and supply. Available solutions include mechanical configurations that may adjust the resonance frequency of piezoelectric resonators and transducers to reduce this fatigue. However, these typically require substantial electric power to operate, and may demand too much power from the source being monitored.

Thus, what is needed is a lower power solution to this problem, where the resonance frequency of piezoelectric resonators and transducers can be adjusted to reduce this fatigue. As will be seen, the invention provides such a solution in an elegant manner.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which.

DETAILED DESCRIPTION

Figure 1:
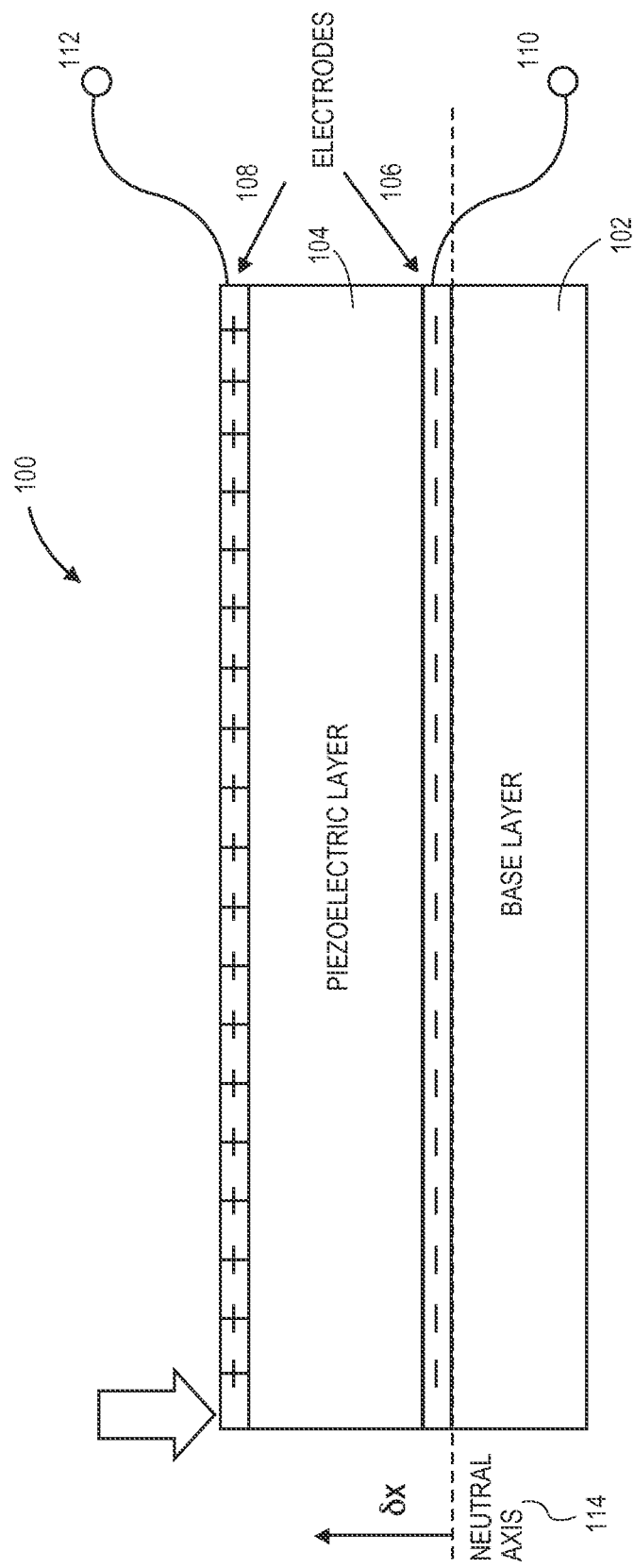
FIG. 1 shows a cross section of a composite piezoelectric coated cantilever configured according to one embodiment.

Provided is an approach to adjusting the frequency response of piezoelectric crystals while in use in sensing or energy scavenging applications. This allows for the tuning of piezoelectric resonators and oscillators while in use to reduce the rate of fatiguing of piezoelectric energy scavengers and/or to alter the amplitude of response of the device by changing its mechanical resonant frequency relative to the operating frequency of the power system. The reduction of fatigue promotes a long operating life of devices, and also provides the ability to adjust the resonance frequency of piezoelectric resonators and transducers by use of a circuit rather than mechanical means, requiring substantially less electric power in operation.

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout There exists both meso-scale and MEMS-scale AC current sensors and related proximity-based devices that will scavenge electrical energy from nearby energized conductors. Described herein are embodiments and examples for making these devices tunable This ability to tune provides important performance improvements: It enables the AC current sensor structure to be adjusted to provide linear response to AC electric currents, or to be tuned so as to act as an efficient scavenger of energy from electrically energized conductors such as overhead power lines or common appliance cords; adjusting can also enable a high-Q scavenger coupled to an AC electric circuit where the excitation frequency varies to be adjusted for maximum efficiency; the principle can also be used with piezoelectric devices scavenging energy from mechanical energy sources to be adjusted for maximum efficiency as the excitation frequency varies.

Many types of AC sensors exist that could be used by the power industry to monitor overhead power lines. Embodiments described herein uses properties of the sensor structures to be adjusted while operating for several purposes. One purpose is to change the function of the device from linear sensing to efficient energy scavenging. Another purpose is to permit use on electrical systems where the power frequency is deliberately or incidentally changed during normal operation, as is the case for example of certain power systems used in airplanes where the power generators are driven mechanically by the aircraft's engines, causing the frequency of the power supply to vary from 300 Hz to perhaps 500 Hz as the aircraft changes speed or altitude; and to accommodate possible small shifts in the frequencies of a power system that is nominally 60 Hz (in the U.S.) but which can shift a few Hz under conditions of heavy drain or incipient malfunctioning.

It has been observed that these innovations may be a solution to at least two problems connected with AC current sensors and devices that will scavenge energy from energized conductors. For one problem, since the energy scavengers typically contain mechanically resonant elements, it would be useful to be able to tune those elements so that their resonant frequency bears a certain relation to the driving frequency of the electric power system (for example, 60 Hz in the U.S., 50 Hz in Europe). Hence, having an efficient electronic tuning method would be useful. Also, as the energy scavengers will be operated at high amplitude in order to derive the most energy possible, the piezoelectric material employed in the scavenger may be subject to mechanical fatigue. In order to maximize the scavenger's useful operating lifetime, it may be desirable to be able to either reduce the amplitude of the resonant element's response or turn off the device occasionally when it has stored sufficient energy for system operation. For this purpose, the embodiments disclosed herein could be used to shift the resonant frequency of the scavenger so that the scavenger is still withdrawing energy but at a lower than maximum rate.

In yet another embodiment, for use in conjunction with piezoelectric-based sensors for measuring electric AC currents and devices for scavenging energy from nearby energized conductors, the piezoelectric stiffening effect may be used to efficiently adjust the resonant frequency of those devices in order to compensate for the small power system frequency changes that result from variations of power demand and supply. Also provided is an approach to prolong the useful life of the piezoelectric energy scavengers designed to supply energy intermittently to power wireless sensor networks. The approaches described may also be applicable to piezoelectric energy scavengers designed to scavenge energy from other energy sources.

One embodiment employs the effect known as piezoelectric stiffening to adjust the operating properties of piezoelectric crystals used in certain sensing and energy scavenging applications. The effect is based on the fact that the presence or absence of an electric field in a strained piezoelectric crystal such as PZT affects the mechanical stiffness of the crystal. As an example, referring to FIG. 1, a piezoelectric crystal in the form of a cantilever beam that has conducting electrodes on its broad surfaces has a lowest natural resonant frequency that is proportional to the square-root of the stiffness of the piezoelectric measured in the vertical direction perpendicular to the broad surfaces. The device 100 includes a base layer 102, a piezoelectric layer 104 juxtaposed relative to the abase layer. The a piezoelectric layer juxtaposed relative to the base layer includes a first electrode 106 such that, when the piezoelectric layer is stressed, a polarization charge (which is essentially an electrode) 106 appears between the base layer and one side of the piezoelectric layer and an opposite polarization charge (electrode 108) appears on an opposite side of the piezoelectric layer. Contact electrodes 110, 112.

When the electrodes are open-circuited and the crystal is subjected to an impulsive force in the vertical direction, the crystal will resonate at a frequency $f_1$. If a perfectly conducting wire now connects the two electrodes and the impulsive force is applied, the resonant frequency will be lowered to $f_2 = f_1 \times (1-k^2)^{1/2}$ where $k^2$ is the electromechanical coupling factor for the piezoelectric. That factor is roughly equal to the fraction of the total energy (electrical plus mechanical) that is in electrical form. For a strongly piezoelectric material such as PZT this reduction in resonant frequency will be about 6%.

Incremental control may be obtained over the variation of resonant frequency by connecting a variable resistance between the electrodes, so as to be able to vary the adjustment gradually between no adjustments to maximum adjustment as we vary the attached resistance gradually from infinity (open-circuit) to zero (short-circuit). Experimental verification of this ability to tune a piezoelectric crystal somewhat is shown in the graph 200 FIG. 2. The amplitude of vibration of a cantilever beam (piezoelectric current sensor) placed near a conductor carrying AC current was measured optically. The amplitude of vibration is plotted for two cases—infinite load resistance (open circuit) and zero load resistance (short circuit). In practice, a downward shift in resonant frequency of about 6% was observed, thus it is believed that up to 6% shift is possible.

This amount of resonant frequency adjustment is larger than the small variations that occur naturally in electric power system applications. This typically occurs when the operating frequency of an entire power grid may drop just a fraction of a Hertz. And, this occurs when an electrical system becomes heavily loaded as a result of power demand. Thus, according to the invention, electrical monitoring devices such as current sensors and energy scavengers may be adjusted to operate at the AC drive frequency of the system as it changes. Automatic control of this adjustment may be accomplished with an electric circuit that adjusts the loading resistor for maximum sensor output.

Figure 3:
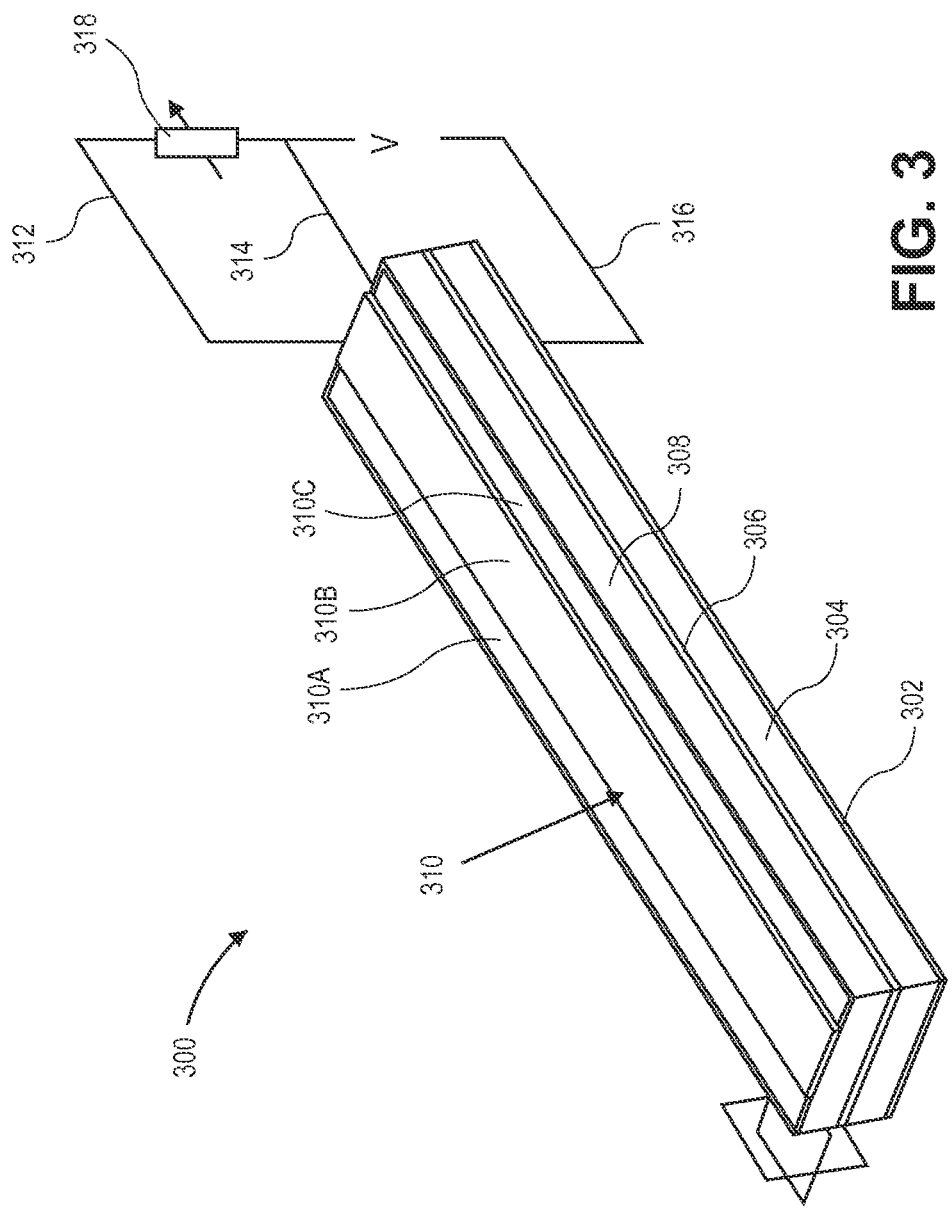
FIG. 3 shows a cross section of a composite piezoelectric coated cantilever configured according to one embodiment.

FIG. 3 shows another embodiment of the single piezoelectric resonator of FIG. 1, where a two-layer piezoelectric resonator 300 is shown. The two regions 304, 308 of the resonator are connected together mechanically but share only one electrical connection—the middle electrode 306. This is a variant on the so-called "bimorph" piezoelectric structure, in which usually the poling directions of the two layers are opposite, in order to obtain maximum response. Here, the directions of crystal response in the two regions are unimportant to the operation of the adjustable device. The functions of the two regions are now separated. Now, one region may be used for sensing or energy scavenging. The other region with its control resistance may be used for adjusting the resonant frequency. As variants on the structure of FIG. 3, in order to tailor the variable frequency behavior, a geometrically similar structure may be configured in which the thicknesses of the top layer 310 (shown in this example with three separate parts 310A, 310B, 310C) and bottom layer 302 differ.

In one alternative, the respective electrode areas and shapes differ. In another, the piezoelectric materials in the two regions differ. In yet another, the areas of the two regions differ. In either configuration, the result is the ability to tailor the character of the control and the measurement or energy scavenging regions.

Figure 2:
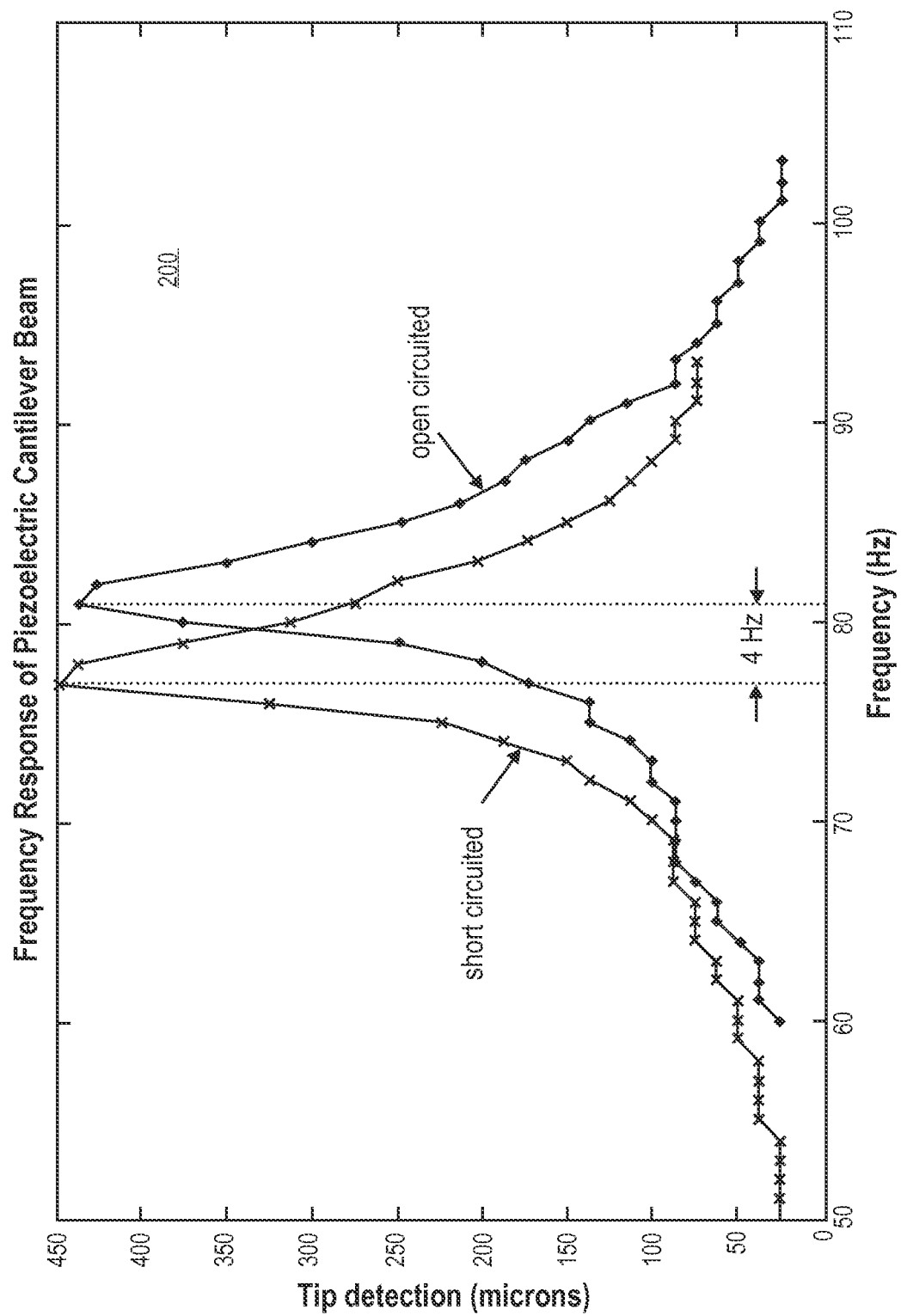
FIG. 2 is a graph showing test results of a control method according to one embodiment.

In another embodiment, in connection with FIG. 2 adjustment capability may be employed together with devices operating in a vacuum. This is because the quality factor, Q, of a given resonator is higher than it is for the same resonator operating in the same gas at a higher pressure. Hence, a given shift of resonant frequency will cause a larger shift in the amplitude of resonator motion for a given fractional change of stiffness.

It has been observed that the linearity of response of a piezoelectric device is greater when the devices operate with the device resonant frequency that is different from the drive frequency. It has also been observed experimentally that operating a piezoelectric device configured as an AC current sensor with its resonant and drive frequencies provide substantially similar results in nonlinear operation and at a higher voltage output than when those two frequencies differ. It is known that operating some piezoelectric materials, such as PZT, at high amplitudes causes the material to fatigue and fail more rapidly. Hence, the ability to adjust device properties dynamically could be employed to advantage with piezoelectric energy scavengers configured according to the invention. Thus, a piezoelectric scavenger installed on an energized conductor, such as an overhead power line, could be operated in its most efficient regime when it was needed to supply energy to a load, such as a radio chip, and then adjusted to less efficient but smaller amplitude and hence less fatigue-producing operation in order to prolong its useful operating life.

Figure 4:
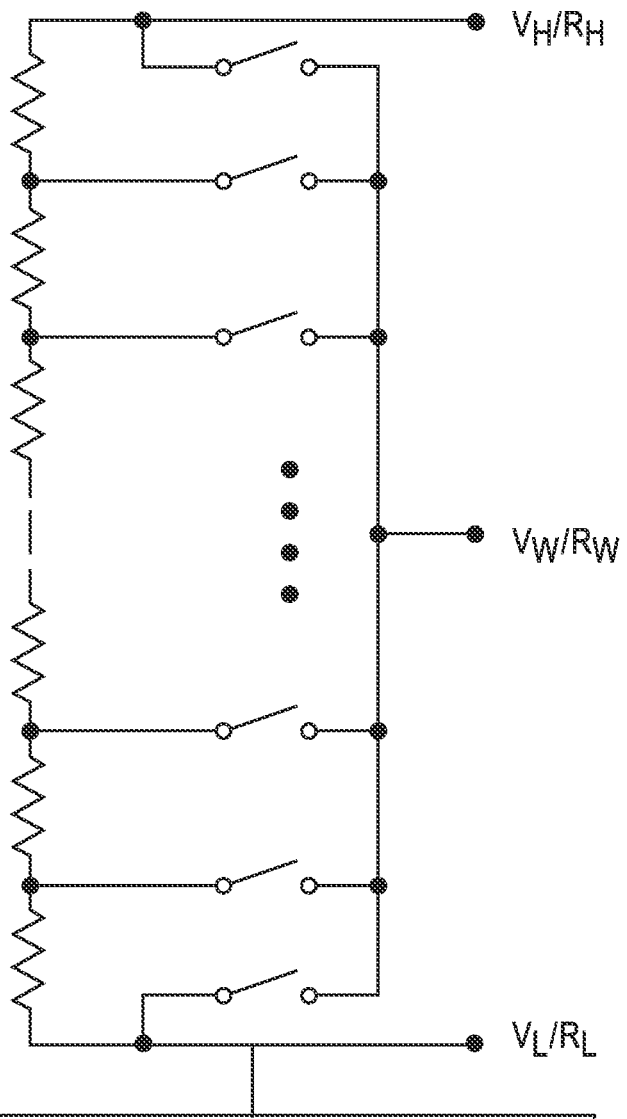
FIG. 4 shows an example of a potentiometer.
Figure 5:
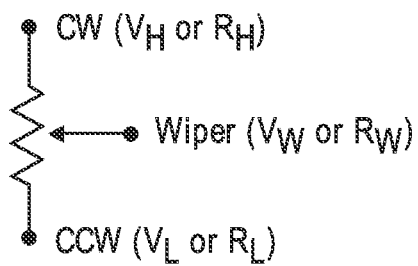
FIG. 5 shows another example of a potentiometer.
Figure 6:
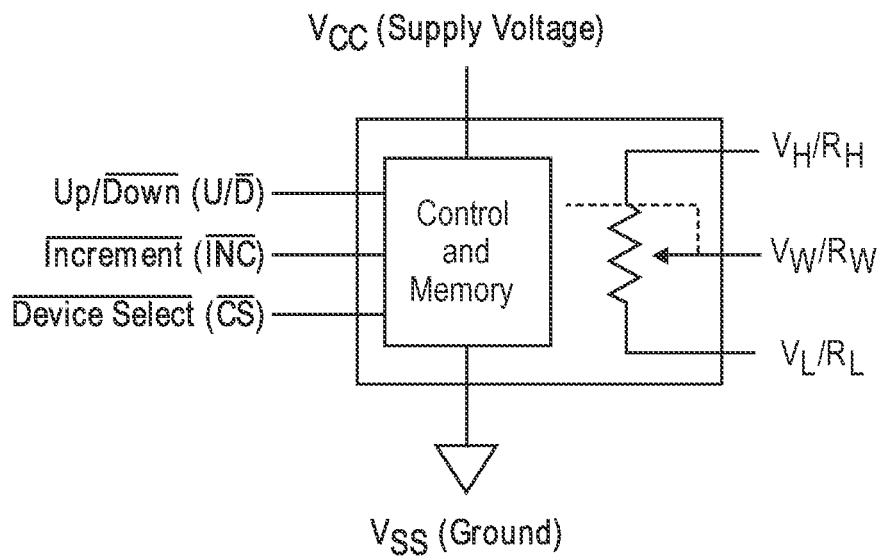
FIG. 6 shows an example of a digitally controlled potentiometer.

Referring to FIG. 4 shows the implementation of the electronic potentiometer. Internally. it is equivalent to a series-connected string of polycrystalline resistors connected between the $R_H$ and $R_L$ terminals of the device; solid-state switches implemented by nMOS or CMOS transistors are connected at each end of the resistor array and between the resistors. Only one switch will be closed at a time. Thus by inputting the appropriate digital signal, one can select any of a large number of resistances. FIG. 5 shows a symbol of a potentiometer of FIG. 4, and FIG. 6 shows a digitally controlled potentiometer.

In one embodiment, the structure of FIG. 3 is shown in 710 where a substantial portion of the upper piezoelectric film isn't being used to produce energy would be to have the control electrode (710B) be as shown (or narrower) and have on top of the cantilever electrodes that are separated from 710B by a small amounts and have those also deliver energy to the scavenger circuit. Also, you might show a control signal input to the variable resistor circuit 318 (FIG. 3) that controls the shifting of resonant frequency as desired by the system operating condition at the moment. Layer 302 connects to 316 (FIG. 3); 710A and 710C can be connected together and produce energy that gets used (output of the scavenger, supplied the radio chip, etc.) Layer 710B is the control electrode and voltage between it and center electrode 306 controls the frequency of the vibrating cantilever in response to a control circuit as you've indicated it. The advantage is that almost all of the cantilever's piezoelectric material is used to produce scavenged energy.

The methods disclosed herein for utilizing the piezoelectric stiffening effect to increase the utility of piezoelectric power system devices are also more practical than others known in the art, which typically require extremely high electric fields for their implementation.

Figure 7:
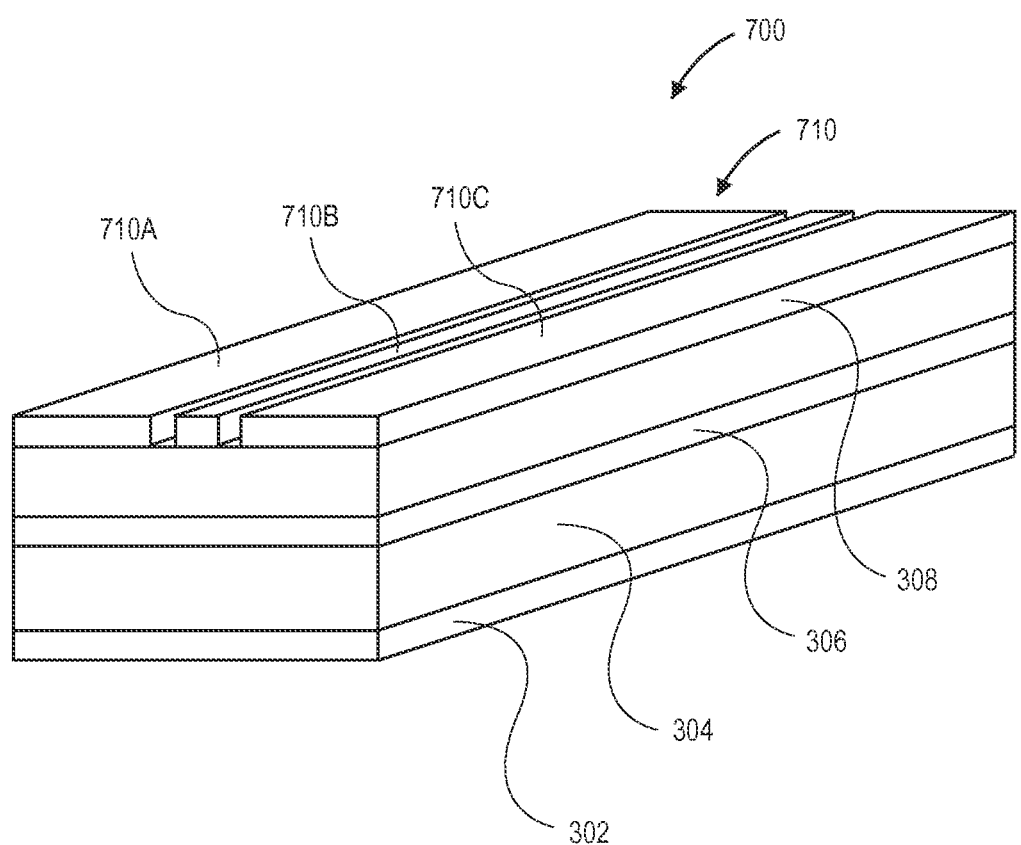
FIG. 7 shows another embodiment of the device of FIG. 3.

Referring to FIG. 7, In operation with the cantilever discussed above we would connect terminals $R_H$ and $R_L$ to electrode layers 710 and 306 respectively, and inputting to a variable impedance circuit, such as the Digitally-Controlled Potentiometer chip, the appropriate coded signals to cause the resonant frequency of the piezoelectric harvester to shift in the desired direction (higher in frequency or lower in frequency) and by the desired amount. For a given harvester application, we would design an appropriate control circuit to generate the desired digital input for the potentiometer.

Figure 8:
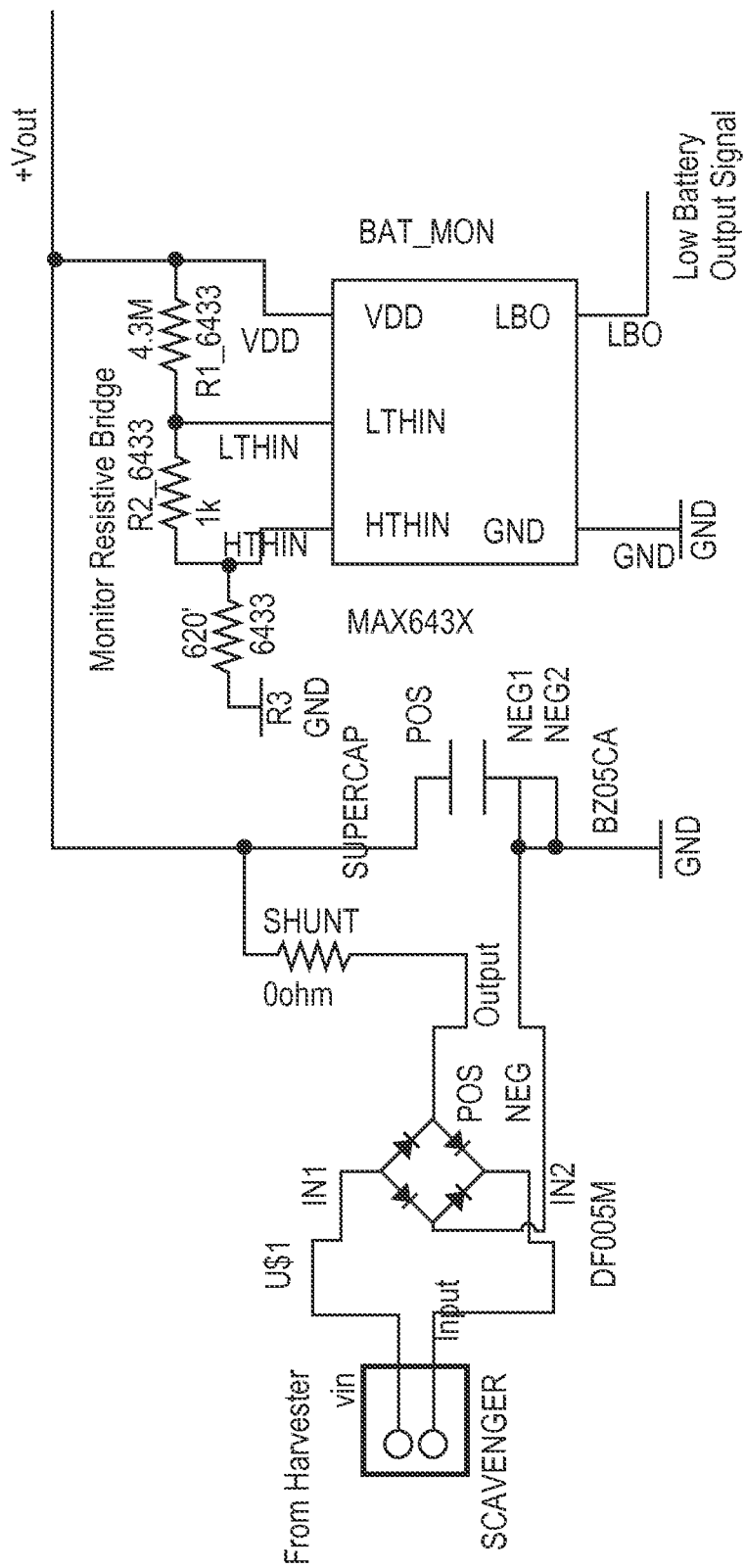
FIG. 8 shows an example of a conditioning circuit used with a scavenger circuit and related components.

FIG. 8 shows a typical circuit that might be used for conditioning the output of the electric energy output from a piezoelectric scavenger. Referring to the FIG. 7 might connect electrode layers 710A and 710B together and connect a wire from them to input terminal 2 of the input marked vin in the circuit diagram FIG. 8. Referring to FIG. 7, one would then connect a wire from electrode layer 302 to input terminal 1 of the input marked vin in the circuit diagram of FIG. 8. The typical power conditioning circuit then rectifies the AC voltage from the Harvester (scavenger) via the four-diode bridge rectifier. The resultant DC charge is then stored in the Supercap. The DC voltage is then available between output terminal marked +Vout and ground (maked GND). The DC output voltage might then be used to drive a radio chip (not shown) that would be connected between terminals +Vout and GND. An additional circuit component, a battery monitor, is shown connected between +Vout and GND here. Its function is to monitor the level of the voltage at all times, and to output a Low Battery Output Signal that can be used to control the operation of the radio.

Returning now to the use of the piezoelectric stiffening effect, one could employ the structure shown in FIG. 7 in which, in addition to the electrodes already mentioned, there is a narrow electrode layer labeled 710. By connecting a device known as a digitally-controlled potentiometer between electrode layers 710 and 306 we can affect the resonant frequency of the cantilever, as has been described above.

Figure 9:
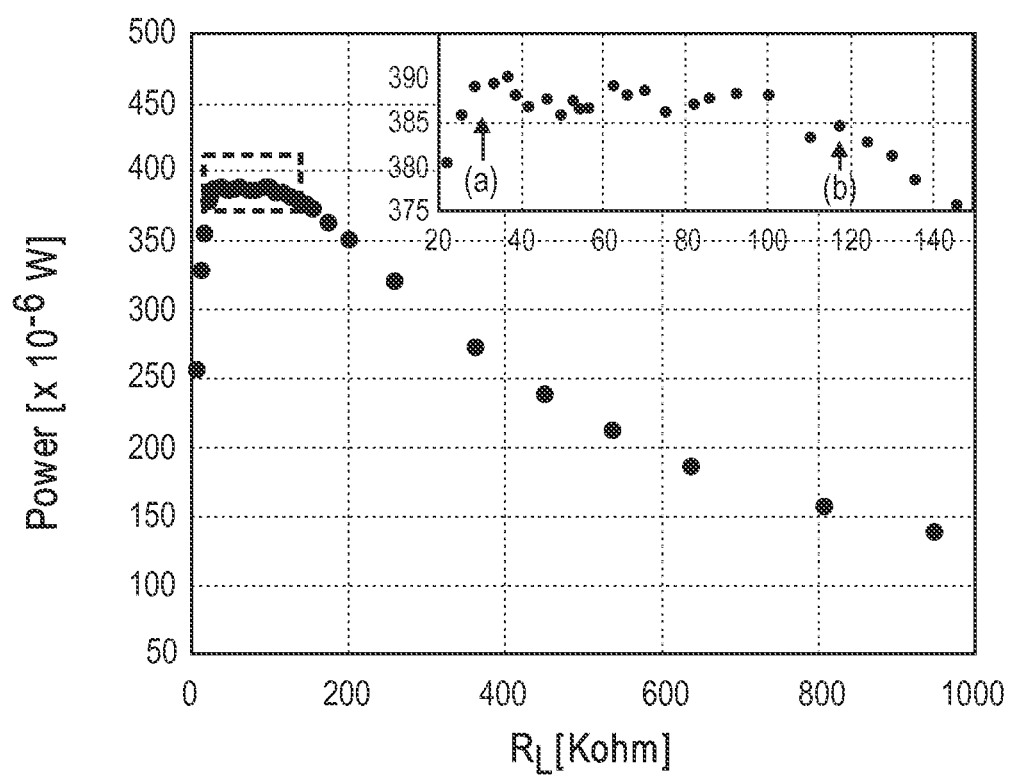
FIG. 9 is a graph showing the optimal load curve for our energy scavenger with high coupling coefficient.

In another embodiment, piezoelectric stiffening may be performed through load compensation without the use of additional electrodes simply by varying the impedance the piezoelectric cantilever responds to through the power conditioning circuit. In cases where the piezoelectric coupling is high, there may exist a range of near optimal load impedance values that ensure maximized power transfer. FIG. 9 is a graph showing the optimal load curve for our energy scavenger with high coupling coefficient. The graph of FIG. 9 shows experimental data, where the flat region (inset) shows close to optimal power when the load resistance is varied from (a) 25 Kohm (kilo-ohms) to (b) 115 Kohm. Beneficially, changing the load resistance changes the voltage across the piezoelectric layer, and hence the stiffness of that layer. The change from (a) to (b) was 1.5 Hz. Illustrated in this curve is that it is possible to perform piezoelectric stiffening without the need for an additional electrode. In some applications, this embodiment obviates an additional electrode that is not used for power scavenging, and hence may prevent a potential net loss in power from the additional electrode.

Figure 10:
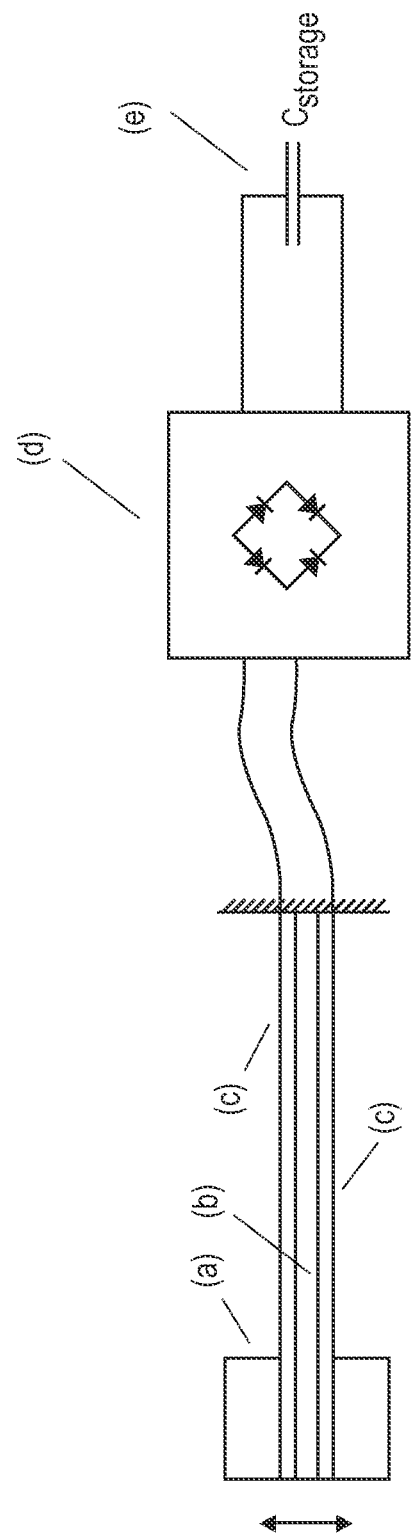
FIG. 10 is an example of a piezoelectric scavenger configured according to one embodiment.

FIG. 10 is a schematic view of a piezoelectric energy scavenger: (a) proof-mass or magnets, (b) structural layer of the piezoelectric cantilever, (c) piezoelectric layer, (d) power conditioning circuit, (e) storage capacitor.

Piezoelectric stiffening though load-compensation can be implemented by designing a power conditioning circuit (FIG. 10) that varies the effective impedance (internal to (d) of FIG. 10) across the electrodes for the piezoelectric layer. In one embodiment, The device may operate without an additional control electrode, where the piezoelectric stiffening is caused by varying the input impedance of the power conditioning circuit, thereby changing the voltage across the piezoelectric layers used for energy scavenging, and hence its stiffens.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An adjustment circuit, comprising:
   a base electrode;
   first and second piezoelectric layers;
   first and second electrodes, the first piezoelectric layer positioned between the first electrode and the second electrode and the second piezoelectric layer positioned between the second electrode and the base electrode;
   a variable resistance coupled between the first and second electrodes;
   an electronic component coupled between the second and base electrodes and configured to scavenge power; and
   a controller coupled to the variable resistance and configured to adjust a resistance of the variable resistance effective to change a stiffness of the first piezoelectric layer.

2. The adjustment circuit of claim 1, wherein the first electrode is narrower than the second electrode.

3. The adjustment circuit of claim 2, further comprising third and fourth electrodes positioned on either side of the first electrode, the first piezoelectric layer being positioned between the first third and fourth electrodes on one side and the second electrode on an opposing side;
   wherein the electrical component is further operable to scavenge electrical energy from the third and fourth electrodes.

* * * * *